(12) United States Patent
Swanson et al.

(10) Patent No.: US 9,547,497 B2
(45) Date of Patent: Jan. 17, 2017

(54) SHARING EMBEDDED HARDWARE RESOURCES

(71) Applicants: Robert C. Swanson, Olympia, WA (US); Robert W. Cone, Portland, OR (US); William J. O'Sullivan, Hillsboro, OR (US); Mariusz Oriol, Gdynia (PL); Pawel Szymanski, Gdansk (PL); Babak Nikjou, Tempe, AZ (US); Madhusudhan Rangarajan, Round Rock, TX (US); Janusz Jurski, Hillsboro, OR (US); Piotr Kwidzinski, Folsom, CA (US); Mariusz Stepka, Gdansk (PL); Piotr Sawicki, Gdansk (PL)

(72) Inventors: Robert C. Swanson, Olympia, WA (US); Robert W. Cone, Portland, OR (US); William J. O'Sullivan, Hillsboro, OR (US); Mariusz Oriol, Gdynia (PL); Pawel Szymanski, Gdansk (PL); Babak Nikjou, Tempe, AZ (US); Madhusudhan Rangarajan, Round Rock, TX (US); Janusz Jurski, Hillsboro, OR (US); Piotr Kwidzinski, Folsom, CA (US); Mariusz Stepka, Gdansk (PL); Piotr Sawicki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,663

(22) PCT Filed: Sep. 27, 2013

(86) PCT No.: PCT/PL2013/000122
§ 371 (c)(1),
(2) Date: Dec. 27, 2013

(87) PCT Pub. No.: WO2015/047112
PCT Pub. Date: Apr. 2, 2015

(65) Prior Publication Data
US 2016/0202994 A1    Jul. 14, 2016

(51) Int. Cl.
*G06F 9/44* (2006.01)
*G06F 15/78* (2006.01)

(52) U.S. Cl.
CPC ......... *G06F 9/4401* (2013.01); *G06F 15/7807* (2013.01)

(58) Field of Classification Search
CPC ... G06F 9/4401; G06F 9/4405; G06F 15/7807
See application file for complete search history.

(56) References Cited

U.S. PATENT DOCUMENTS

| | | | |
|---|---|---|---|
| 2008/0082758 A1* | 4/2008 | Pong | G06F 12/082 711/147 |
| 2012/0060039 A1 | 3/2012 | Leclercq | |

(Continued)

FOREIGN PATENT DOCUMENTS

WO      2013048485 A1      4/2013

OTHER PUBLICATIONS

International Search Report and Written Opinion received for International Application No. PCT/PL2013/000122, mailed May 9, 2014, 8 pages.

*Primary Examiner* — Albert Wang
(74) *Attorney, Agent, or Firm* — Barnes & Thornburg LLP (57) ABSTRACT

Technologies for facilitating inter-system-on-a-chip (SoC) communication include a first SoC, a second SoC, and a dedicated manageability controller network. The first SoC includes a first main processor, a first manageability con- (Continued)

troller, and a memory dedicated to the first manageability controller and having manageability controller firmware stored thereon. The first manageability controller is different from the first main processor and to control functions of the first SoC. The second SoC is different from the first SoC and includes a second main processor and a second manageability control, which is different from the second main processor and to control functions of the second SoC. The second SoC is to access the manageability controller firmware of the memory of the first SoC over the dedicated manageability network.

25 Claims, 7 Drawing Sheets

(56) References Cited

U.S. PATENT DOCUMENTS

2012/0072710 A1* 3/2012 Gupta .................. G06F 9/4405
                                                    713/2
2012/0159513 A1   6/2012 Pakhunov et al.

* cited by examiner

SHARING EMBEDDED HARDWARE RESOURCES

CROSS REFERENCE TO RELATED APPLICATIONS

This application is a national stage entry under 35 USC §371(b) of International Application No. PCT/PL2013/000122, which was filed Sep. 27, 2013.

BACKGROUND

Embedded and system-on-a-chip (SoC) systems are becoming more prevalent in the computing ecosystem. For example, a great number of SoC systems are being deployed in SoC servers in data centers. Traditional servers and SoC servers alike typically require manageability functions in order to operate. Although the manageability functions of a particular system may vary depending on the implementation, they may include, for example, integrity attestation, monitoring and logging (e.g., for malware detection or system operating condition alerts), system configuration and control, software and firmware updates, and other suitable functions. In typical SoC systems, manageability is integrated into the SoC in the form of a microcontroller having its own static random-access memory (SRAM) embedded in the SoC. Additionally, many SoCs may be placed together on a particular field replaceable unit (FRU) for fault isolation and to simplify the replacement of components.

Embedded manageability controllers (e.g., on SoCs) require memory to store code and data for operation. As the number of manageability features implemented in the manageability controllers increases, so does the demand for memory for the necessary data and code storage. Although personal computing systems are able to access host dynamic random-access memory (DRAM) for operation (e.g., via uniform memory access), manageability controllers generally cannot use system host DRAM due to reliability requirements in the server space. Accordingly, SoC-based manageability controllers are effectively limited to the use of SRAM embedded into the SoC, which creates a significant barrier to the introduction of additional manageability features. That is, the associated cost, die size, and power consumption of additional SRAM banks limit the ability to increase the size of the SRAM on the SoC, thereby limiting the number of available manageability functions on the SoC.

In an effort to improve manageability while side-stepping those physical limitations, various techniques have been employed. For example, at least one technique involves paging read-only data and code from external memory (e.g., flash memory accessed over a serial peripheral interface) into the internal SRAM. That is, the portion of the code and data that is actively used at a given point in time is copied from the external memory to the internal SRAM. However, such an approach significantly impacts performance due to reloading from the external memory. Alternatively, external DRAM accessible to the manageability controller and dedicated for its use my be embedded on the SoC; however, such an approach requires a memory controller, which significantly increases chip cost, power consumption, and complexity.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
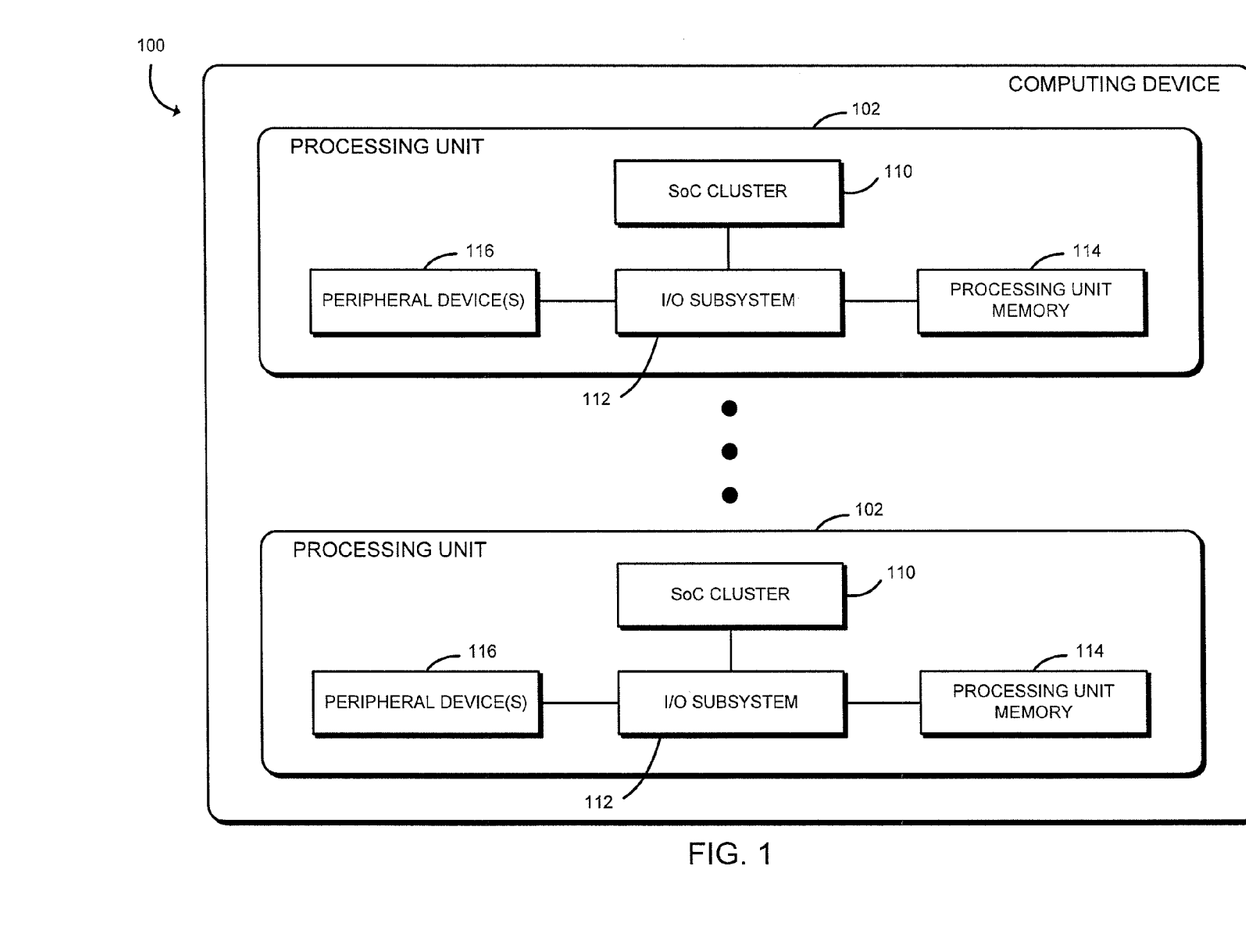
FIG. 1 is a simplified block diagram of at least one embodiment of a computing device facilitating inter-SoC communication.

Referring now to FIG. 1, in the illustrative embodiment, a computing device 100 for sharing embedded hardware resources is configured to facilitate inter-SoC communication over a dedicated manageability controller network. As discussed in detail below, the computing device 100 enables SoCs of the computing device 100 to communicate with one another over a dedicated manageability controller network (i.e., an inter-SoC network) to share hardware resources (see FIGS. 2-4). For example, the SoCs may share SRAM or other memory to enable more expanded manageability functionality than possible with memory isolation.

The computing device 100 may be embodied as any type of computing device capable of engaging in inter-SoC communication to share hardware resources and performing the functions described herein. In the illustrative embodiment, the computing device 100 is embodied as a server computer. However, the technologies described herein may be embodied in other computing devices 100 utilizing SOCs including, for example, a tablet computer, laptop computer, cellular phone, smartphone, personal digital assistant, mobile Internet device, desktop computer, and/or any other computing/communication device. As shown in FIG. 1, the illustrative computing device 100 includes one or more processing units 102. Each of the one or more processing units 102 may be embodied as any type of processing unit capable of performing the functions described herein. For example, in some embodiments, the processing units 102 are embodied as FRUs such that each processing unit 102 is a separate circuit board or physical structure or assembly (e.g., for fault isolation and easy replacement).

In the illustrative embodiment, each of the one or more processing units 102 includes a SoC cluster 110, an input/output (I/O) subsystem 112, a processing unit memory 114, and one or more peripheral devices 116. Accordingly, in some embodiments, the processing units 102 may identify those SoC clusters 110, I/O subsystems 112, processing unit memory 114 and peripheral devices 116 associated with one another. It should be appreciated that one or more of the processing units 102 may include other or additional components, such as those commonly found in a typical computing device or processing unit (e.g., various input/output devices), in other embodiments. Additionally, in some embodiments, one or more of the illustrative components may be incorporated in, or otherwise form a portion of, another component. Similarly, the computing device 100 may include other additional components (e.g., communication circuitry, data storage, and/or peripheral devices) and/or have integrated/incorporated components in some embodiments.

As discussed below in more detail with regard to FIGS. 2-4, each of the SoC clusters 110 includes one or more SoCs 202. In the illustrative embodiments discussed herein, at least one of the SoC clusters 110 includes at least two SoCs 202 and a dedicated manageability controller network 204 through which the SoCs 202 may communicate with one another to share hardware resources (e.g., memory). The processing unit memory 114 of each processing unit 102 may be embodied as any type of volatile or non-volatile memory or data storage capable of performing the functions described herein. For example, the processing unit memory 114 may be embodied as SRAM, DRAM, serial peripheral interface (SPI) flash memory, or other volatile or non-volatile memory or data storage. In operation, the processing unit memory 114 may store various data and software used during operation of the computing device 100 such as operating systems, applications, programs, libraries, and drivers. The processing unit memory 114 is communicatively coupled to the SoC cluster 110 via the I/O subsystem 112, which may be embodied as circuitry and/or components to facilitate input/output operations with the SoC cluster 110, the processing unit memory 114, and other components of the processing unit 102. For example, the I/O subsystem 112 of each processing unit 102 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The peripheral devices 116 of each processing unit 102 may include any number of additional peripheral or interface devices. The particular devices included in the peripheral devices 116 may depend on, for example, the type and/or intended use of the computing device 100.

Figure 2:
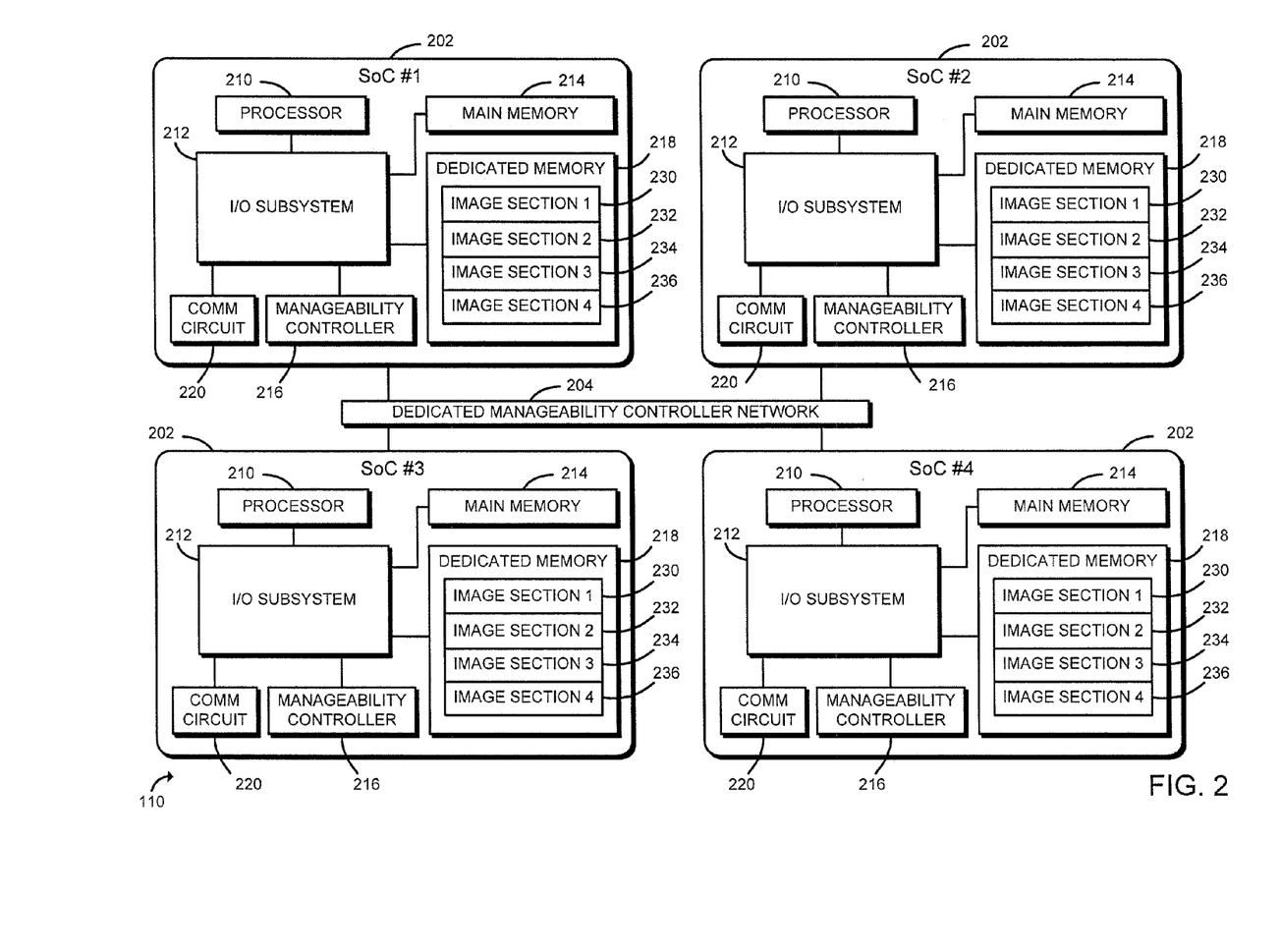
FIG. 2 is a simplified block diagram of at least one embodiment of a SoC cluster of the computing device of FIG. 1.
Figure 3:
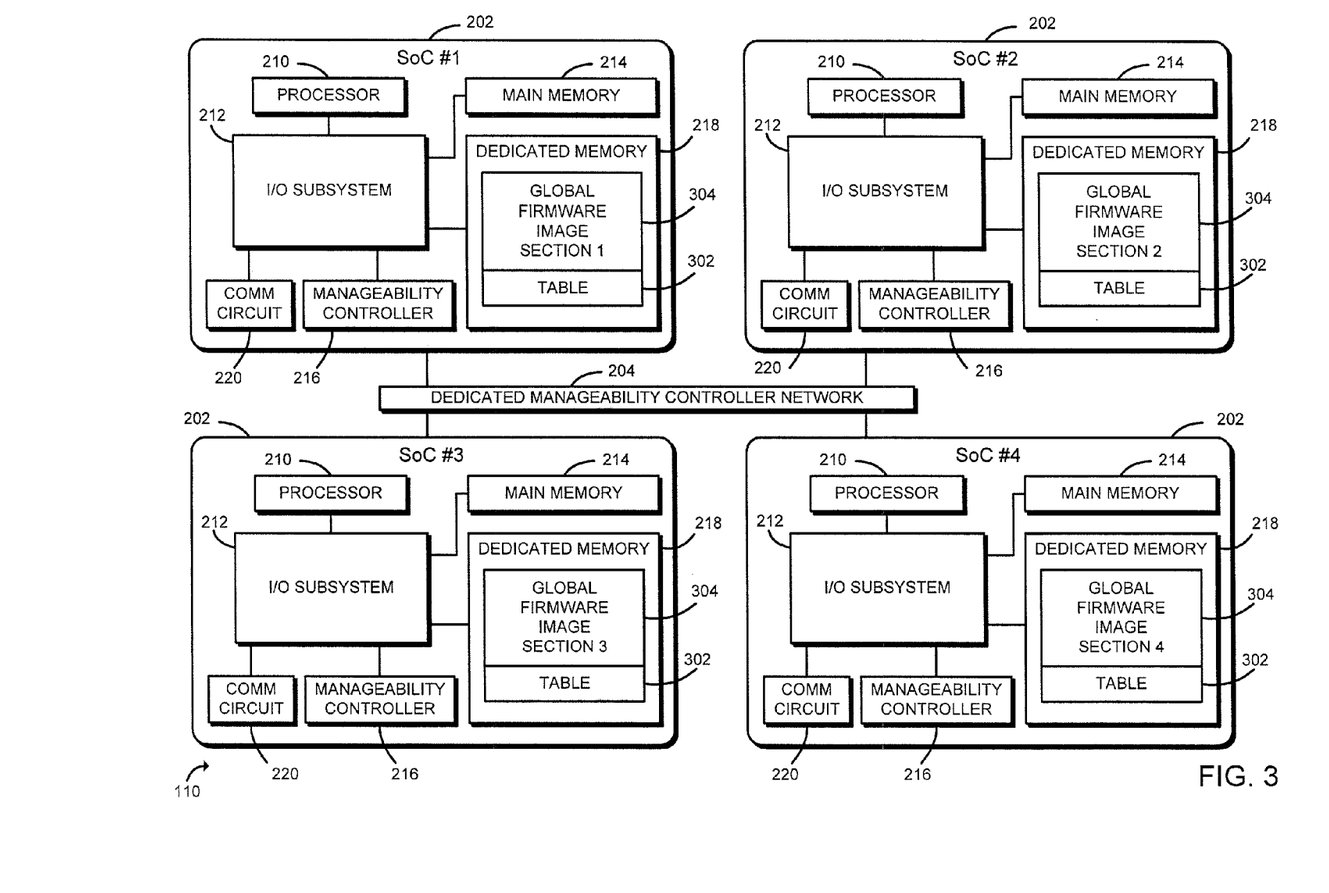
FIG. 3 is a simplified block diagram of at least one other embodiment of a SoC cluster of the computing device of FIG. 1.
Figure 4:
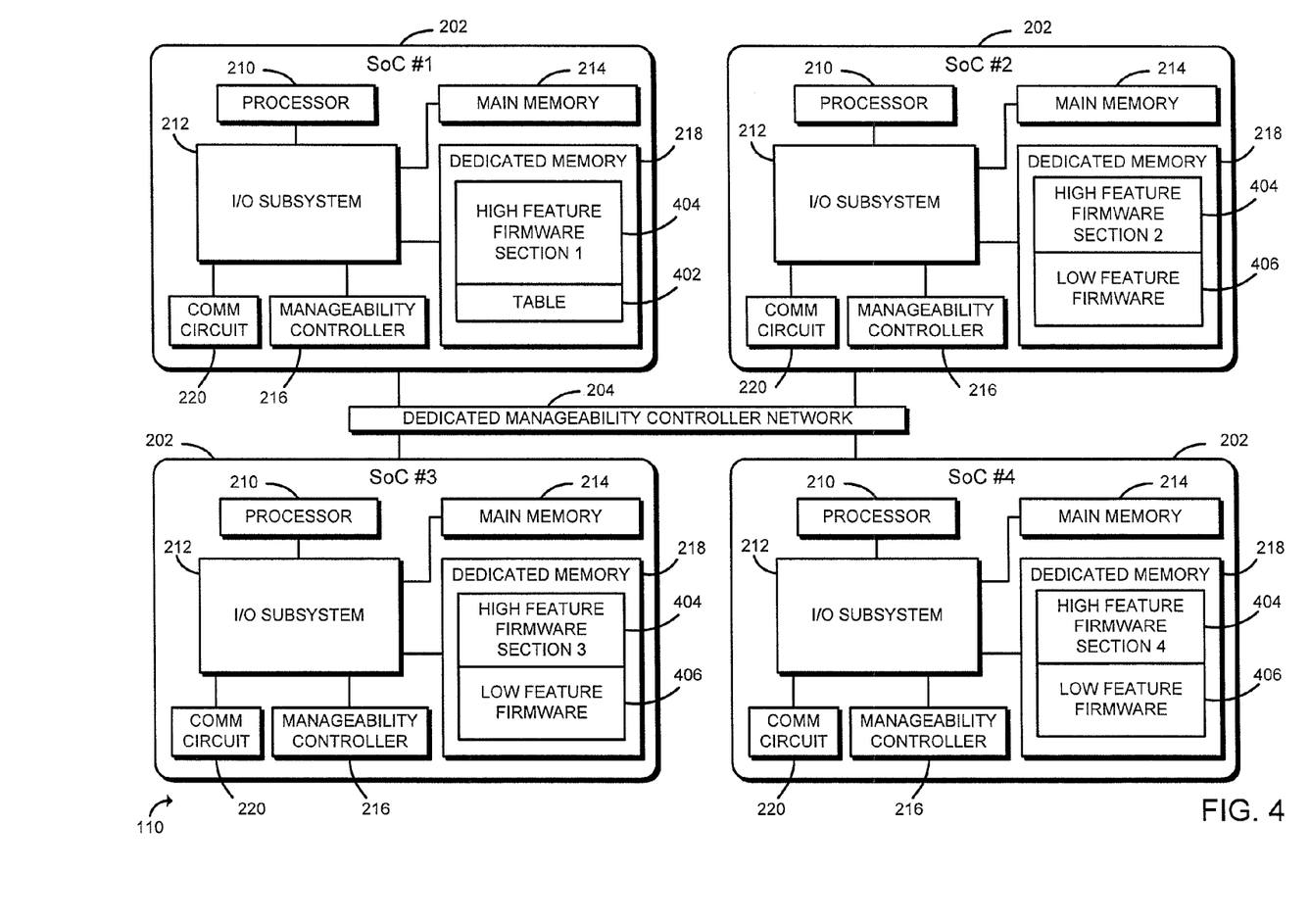
FIG. 4 is a simplified block diagram of at least one other embodiment of a SoC cluster of the computing device of FIG. 1.

Referring now to FIGS. 2-4, in the illustrative embodiments, the SoC cluster 110 of each of the processing units 102 of the computing device 100 includes a number of SoCs 202 (e.g., two or more) configured to communicate with one another over a dedicated manageability controller network 204 to share hardware resources. In FIG. 2, the illustrative SOC cluster 110 includes four SoCs 202; however, in other embodiments, the SoC cluster 110 may include a greater or fewer number of SoCs 202. Each SoC 202 is embodied as an integrated circuit that includes several components of the computing device 100 integrated onto a single integrated circuit chip or die. More specifically, in the illustrative embodiments of FIGS. 2-4, each SoC 202 includes a processor 210, an I/O subsystem 212, a main memory 214, a manageability controller 216, a dedicated memory 218, and a communication circuitry 220. Of course, one or more of the SoCs 202 may include other or additional components, such as those commonly found in a typical SoC (e.g., a memory controller) in other embodiments. Additionally, in some embodiments, one or more of the illustrative components may be incorporated in, or otherwise form a portion of, another component. For example, the dedicated memory 218 may form a portion of the main memory 214 in some embodiments (e.g., in a secure partition). Similarly, the SoCs 202 may include other additional components in some embodiments.

The processor 210 of each of the SoCs 202 may be embodied as any type of processor capable of performing the functions described herein. For example, the processor 210 may be embodied as a single or multi-core processor, digital signal processor, microcontroller, microprocessor, or other processor or processing/controlling circuit. The main memory 214 may be embodied as any type of volatile or non-volatile memory or data storage capable of performing the functions described herein. The main memory 214 is communicatively coupled to the processor 210 via the I/O subsystem 212, which may be embodied as circuitry and/or components to facilitate input/output operations with the processor 210, the main memory 214, and other components of the SoC 202. The I/O subsystem 212 may be embodied similar to the I/O subsystem 112 of the processing unit 102 but different in scope. That is, the I/O subsystem 112 is configured to handle input/output operations between the SoC cluster 110, the processing unit memory 114, the peripheral devices 116, and devices/components external to the processing unit 102, whereas the I/O subsystem 212 is configured to handle input/output operations within the SoC 202 (e.g., between the manageability controller 216 and the dedicated memory 218).

The manageability controller 216 of each of the SoCs 202 may be embodied as any hardware component(s) or circuitry capable of performing manageability functions for the computing device 100 and otherwise performing the functions described herein. For example, as indicated above, the manageability controller 216 may perform manageability functions such as integrity attestation, monitoring and logging, system configuration and control, software and firmware updates, and other suitable functions depending on the particular controller 216. In some embodiments, the manageability controller 216 may be embodied as an embedded microcontroller, a manageability engine (ME), a converged security engine (CSE), a trusted platform module (TPM), or another controller. Further, in some embodiments, the manageability controller 216 may form a portion of the processor 210 of the SoC 202. In the illustrative embodiments of FIGS. 2-4, the dedicated memory 218 is embodied as SRAM or other memory capable of storing data and code for manageability features of the manageability controller 216.

The communication circuitry 220 of each of the SoCs 202 may be embodied as any communication circuit, device, or collection thereof, capable of enabling communications between one SoC 202 with another SoC 202 of the same SoC cluster 110 over the dedicated manageability controller network 204. More specifically, as discussed in detail below, the dedicated memory 218 may store data and/or code for manageability features of a manageability controller 216 of another SoC 202 (e.g., in addition to storing data and code for its own manageability controller 216) within the same SoC cluster 110 and may share that data and/or code with the other manageability controller 216 over the dedicated manageability controller network 204.

The dedicated manageability controller network 204 may be embodied as any number of various communication links (e.g., point-to-point links, bus links, wires, cables, light guides, printed circuit board traces, etc) and/or other components and subsystems to facilitate communication between the SoCs 202 of the SoC cluster 110. For example, the dedicated manageability controller network 204 may be embodied as or otherwise include a fabric-to-fabric interface and/or common board-level fabric. As discussed below, the dedicated manageability controller network 204 enables the manageability controllers 216 from any of the SoCs 202 within the same SoC cluster 110 (i.e., in the same processing unit 102) to access memory (e.g., the dedicated memory 218) and/or other resources from another SoC 202 within that SoC cluster 110. Depending on the particular embodiment and/or the complexity of the SoC cluster 110, the dedicated manageability controller network 204 may be embodied as point-to-point links or a multi-tiered common bus or switch for inter-SoC communication. It should be appreciated that, in the illustrative embodiments, the dedicated manageability controller network 204, unlike the I/O subsystem 212, handles only communication between the manageability controllers 216 and other manageability controllers 216 or dedicated memory 218.

As shown by the memory contents of the SoC clusters 110 of the embodiments of FIGS. 2-4, the computing device 100 may facilitate sharing of hardware resources between SoCs 202 in a variety of ways. It should be appreciated, however, that the inter-SoC communication described herein is not limited to those particular embodiments. Referring now specifically to FIG. 2, the SoC cluster 110 includes four SoCs 202 in which each SoC 202 stores the same firmware image (e.g., for operational redundancy) in its dedicated memory 218. Specifically, the dedicated memory 218 of each of the SoCs 202 includes a first firmware image section 230, a second firmware image section 232, a third firmware image section 234, and a fourth firmware image section 236. In the illustrative embodiment, the first firmware image section 230 includes data and code (e.g., instructions) for use by the manageability controller 216 of the first SoC 202 in performing its manageability functions. The second firmware image section 232 includes data and code for use by the manageability controller 216 of the second SoC 202 in performing its manageability functions. Similarly, the third firmware image section 234 includes data and code for use by the manageability controller 216 of the third SoC 202 in performing its manageability functions, and the fourth firmware image section 236 includes data and code for use by the manageability controller 216 of the fourth SoC 202 in performing its manageability functions.

If one of the manageability controllers 216 is unable to access the data and code for its manageability functions from its onboard, local dedicated memory 218 (i.e., the dedicated memory 218 embedded on the same SoC 202), that manageability controller 216 may access the dedicated memory 218 of another SoC 202 within the SoC cluster 110 to retrieve the relevant firmware section (e.g., in response to a load fault or other memory access fault) over the dedicated manageability controller network 204. For example, suppose without loss of generality that the manageability controller 216 of the first SoC 202 is unable to load the firmware associated with its manageability functions (i.e., the first firmware image section 230). In that case, that manageability controller 216 may access the first firmware image section 230 from the dedicated memory 218 of one of the other SoCs 202 (i.e., the second, third, or fourth SoC 202). In such a way, the manageability controller 216 is able to efficiently load the necessary firmware for its operations without, for example, accessing slower SPI flash or other memory external to the SoC cluster 110.

Referring now to FIG. 3, in another embodiment, the illustrative SoC cluster 110 includes four SoCs 202 in which each SoC 202 stores a table 302 and a global firmware image section 304 in its dedicated memory 218. In the illustrative embodiment, a global firmware image is striped into four global firmware image sections 304 and one of those global firmware image sections 304 is stored on each of the four illustrative SoCs 202. Specifically, without loss of generality, the first global firmware section 304 is stored on the first SoC 202, the second global firmware section 304 is stored on the second SoC 202, the third global firmware section 304 is stored on the third SoC 202, and the fourth global firmware section 304 is stored on the fourth SoC 202. Depending on the particular embodiment and the embedded hardware resources of the particular SoCs 202, each of the global firmware sections 304 may or may not be of the same size.

In the illustrative embodiment, a table 302 is also stored in the dedicated memory 218 of each of the SoCs 202. The table 302 may be embodied as any data structure suitable to be queried, read, and/or otherwise accessed by one or more manageability controllers 302 to determine the memory location of a particular firmware section or subsection of the global firmware image. In some embodiments, only one of the SoCs 202 includes the table 302 in its dedicated memory 218 (e.g., to allow for more memory space for the global firmware image). In such embodiments, the manageability controllers 216 of the other SoCs 202 are able to access that table 302 over the dedicated manageability controller network 204. In another embodiment, the table 302 may additionally or alternatively track cached and non-cached image code and data sections. If a cache miss occurs, the data may be retrieved, for example, from slower media (e.g., SPI flash).

It should be appreciated that the illustrative embodiment of FIG. 3 may allow for improved functionality of the manageability controllers 216 by ensuring that there is little unused memory in the dedicated memory 218. As such, firmware of a larger size, and thus having greater feature set and complexity, may be implemented by each of the SoCs 202 due to the ability to stripe the larger, global firmware across multiple dedicated memories 218. Additionally, in a typical implementation, one or more of the manageability controllers 216 may utilize a significant amount of dedicated memory 218 for storing data and code associated with its manageability functions and other manageability controllers 216 may not. By enabling the manageability controllers 216 to access the dedicated memory 218 of one another over the dedicated manageability controller network 204, any unused memory 218 may be shared (e.g., to store data and code associated with another manageability controller 216 of the SoC cluster 110).

Referring now to FIG. 4, in yet another embodiment, the illustrative SoC cluster 110 includes four SoCs 202 in which each SoC 202 stores a high feature firmware section 404 associated with the manageability functions of the manageability controller 216 of the first SoC 202 (e.g., the "primary" manageability controller of the SoC cluster 110), without loss of generality. Additionally, the first SoC 202 stores a table 402 and each of the other SoCs 202 stores low feature firmware 406 associated with the manageability functions of its own manageability controller 216. In the illustrative embodiment, the manageability controller 216 of the first SoC 202 involves advanced features and/or more complicated functionality. In some cases, those features may only be able to run in an embedded controller of one of the SoCs 202 (e.g., for board-level power monitoring and limiting). In such cases, paging or otherwise accessing the firmware from an external memory is not a viable option. In the illustrative embodiment, the manageability controller 216 of each of the other SoCs 202 involve relatively less complicated functionality requiring less memory to store data (e.g., simple proxy access to manageability hardware components). In other words, the first manageability controller 216 requires "high feature" firmware, whereas the other manageability controllers 216 require only "low feature" firmware.

As such, each low feature firmware image 406 corresponding to the manageability features of the manageability controller 216 is stored in the dedicated memory 218 of the corresponding SoC 202. Additionally, the high feature firmware image is striped into four high feature firmware sections 404 and stored across the dedicated memory 218 of the SoCs 202. It should be appreciated that the size of each of the high feature firmware sections may be based on the memory size of the low feature firmware images 406 (e.g. to efficiently utilize the dedicated memory 218 of the SoCs 202). More specifically, the first high feature firmware section 404 is stored on the first SoC 202, the second high feature firmware section 404 is stored on the second SoC 202, the third high feature firmware section 404 is stored on the third SoC 202, and the fourth high feature firmware section 404 is stored on the fourth SoC 202. Additionally, the dedicated memory 218 of the first SoC 202 includes a table 402 similar to the table 302 described above with regard to FIG. 3. Accordingly, the manageability controller 216 of the first SoC 202 may access the table 402 to determine the memory location of a section or subsection of the high feature firmware image. It should be appreciated that the embodiments described above with reference to FIGS. 2-4 may utilize, for example, a different number of SoCs 202 or firmware sections and may have tables, firmware section sizes, and SoCs 202 with different characteristics in other embodiments. For example, in some embodiments, more than one SoC 202 in a given SoC cluster 110 may include a high feature manageability controller 216.

Figure 5:
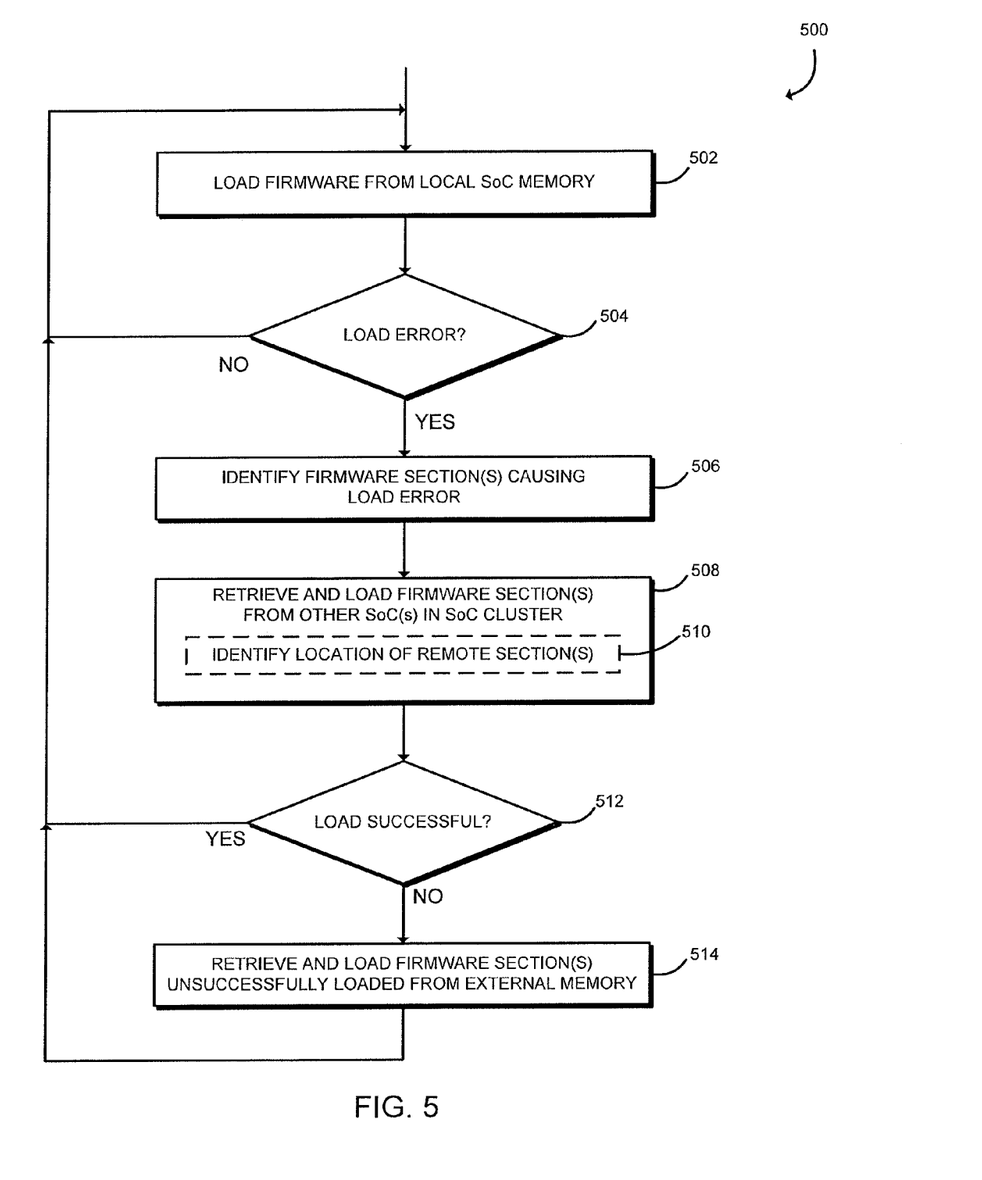
FIG. 5 is a simplified flow diagram of at least one embodiment of a method for sharing hardware resources in a SoC cluster for operational redundancy.

Referring now to FIG. 5, in use, the computing device 100 may execute a method 500 for sharing hardware resources in the SoC cluster 110 for operational redundancy. The method 500 may be implemented, for example, in those embodiments in which a global firmware image is copied in each of the dedicated memories 218 (see, e.g., FIG. 2). The illustrative method 500 begins with block 502 in which a manageability controller 216 of a SoC 202 within the SoC cluster 110 loads firmware from the local SoC memory (e.g., from the dedicated memory 218 of that SoC 202). In block 504, the manageability controller 216 determines whether there was a load error. For example, upon loading (or attempting to load) the firmware from the local SoC memory, a load error, memory fault, or other operational error related to loading the firmware from the local SoC memory may occur. If not, the method 500 returns to block 502 and waits for the next firmware section to be loaded.

However, if in block 504 the manageability controller 216 determines that a load error has occurred, the manageability controller 216 identifies the firmware section(s) causing the load error in block 506. It should be appreciated that the manageability controller 216 may use any suitable methodology for doing so. Additionally, in some embodiments, the manageability controller 216 may determine that more than one firmware image section caused the load error. In block 508, the manageability controller 216 retrieves and loads the identified firmware section (i.e., a copy of the firmware section(s) causing the load error) from the memory of another SoC 202 in the SoC cluster 110. In doing so, the manageability controller 216 may identify the memory location of the identified remote firmware section(s) in block 510. As discussed above, the manageability controller 216 may query a table (e.g., stored on the local SoC) to determine the relevant memory location and retrieve the firmware section(s) over the dedicated manageability controller network 204. In some embodiments, a desired firmware section may be located on more than one remote SoC 202 (i.e., within the SoC cluster 110). In such embodiments, the manageability controller 216 may determine which SoC 202 from which to access the firmware section using any suitable mechanism (e.g., access the firmware from the "least busy" SoC 202). It should be appreciated that, in some embodiments, the manageability controller 216 may execute the identified remote firmware section(s) directly from the remote SoC 202 (i.e., without paging or otherwise copying the remote firmware sections to the local SoC 202).

In block 512, the manageability controller 216 determines whether loading the retrieved firmware section(s) was successful. If so, the method 500 returns to block 502 and waits for the next firmware section to be loaded. However, if the manageability controller 216 determines that the load was unsuccessful (i.e., that a load error occurred), the manageability controller 216 retrieves and loads the unsuccessfully loaded firmware sections from external memory (e.g., from SPI flash) in block 514. In other words, the manageability controller 216 first attempts to access and load a "clean" version of the faulty firmware sections from within the SoC cluster 110. If the manageability controller 216 is unable to do so, the manageability controller 216 resorts to retrieving the firmware sections from the slower external memory (e.g., the processing unit memory 114). Of course, if the firmware section causing the load error is not stored on dedicated memory 218 of a SoC 202 within the SoC cluster 110, the manageability controller 216 may resort directly to accessing a version stored in external memory. It should be appreciated that, in some embodiments, the firmware sections identified as causing a load error in block 506 may be different from the firmware sections unsuccessfully loaded from the remote SoC 202. For example, the unsuccessfully loaded firmware sections may constitute a subsection of the identified firmware section. This may happen, for example, if a portion of the retrieved firmware section(s) is able to successfully load from the remote SoC 202. Additionally, in other embodiments, the loading of the retrieved firmware sections may cause other firmware sections to cause load errors not previously identified in block 506.

Figure 6:
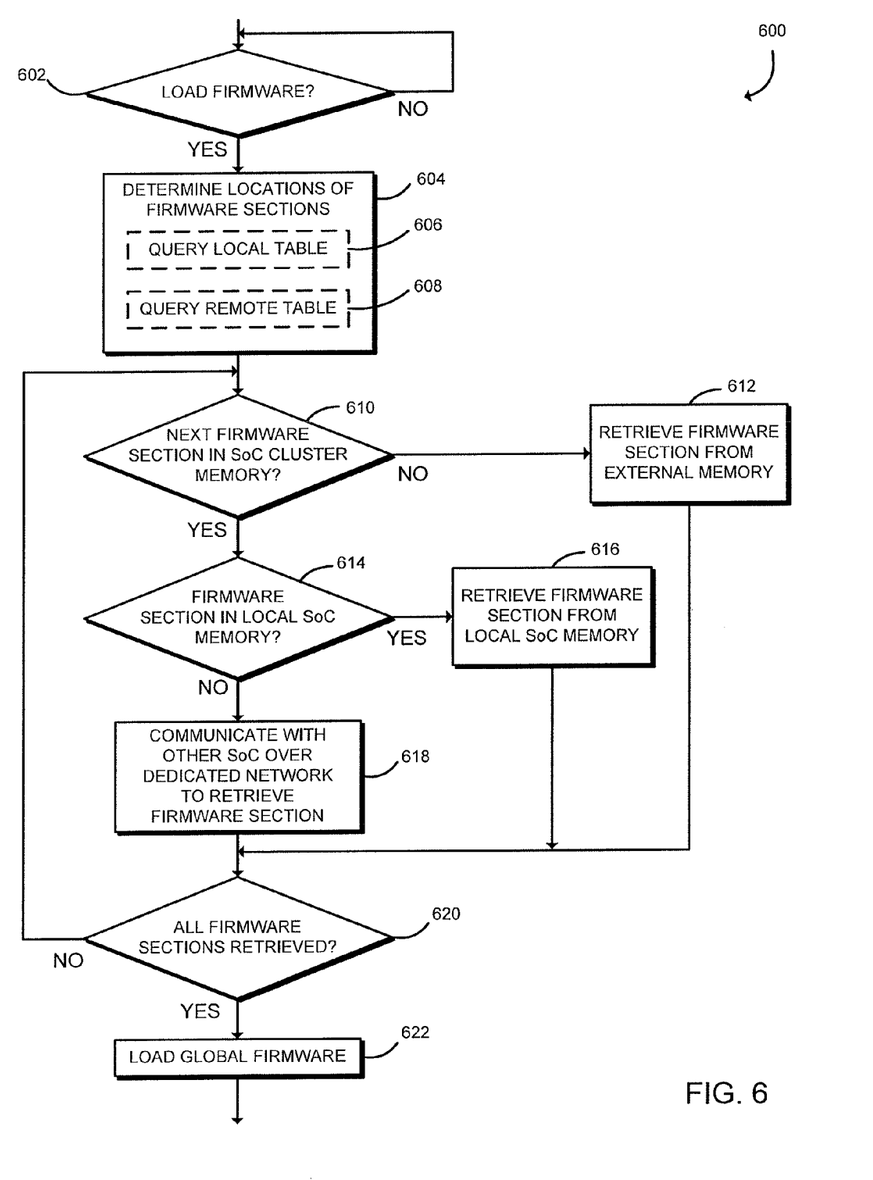
FIG. 6 is a simplified flow diagram of at least one embodiment of a method for sharing hardware resources between a SoC and other SoCs within a SoC cluster.

Referring now to FIG. 6, in use, the computing device 100 may execute a method 600 for sharing hardware resources between a SoC 202 and other SoCs 202 within the same SoC cluster 110. The method 600 may be implemented, for example, in those embodiments in which a global firmware image is striped across the different dedicated memories 218 of the SOCs 202 (see, e.g., FIG. 3). The illustrative method 600 begins with block 602 in which the manageability controller 216 determines whether to load firmware. If so, the manageability controller 216 determines the locations of the firmware sections to load in block 604. In other words, the manageability controller 216 determines the locations of firmware sections that constitute portions of a global firmware to be loaded. As discussed above, the global firmware may be striped across several dedicated memories 218 to support, for example, firmware of greater size and capabilities. The manageability controller 216 may determine the locations of the various firmware sections by querying a local table in block 606. As discussed above, the local SoC 202 may store a table 302 identifying the memory locations (e.g., which dedicated memory 218) of firmware sections and/subsections from which to load those sections. Alternatively or additionally, the manageability controller 216 may query a remote table in block 608 to determine the locations of the desired firmware sections. For example, in some embodiments, a primary SoC 202 may include a table identifying the memory locations of the firmware sections, which may be queried by the other SoCs 202 of the SOC cluster 110 over the dedicated manageability controller network 204.

In block 610, the manageability controller 216 determines whether the next firmware section to retrieve is located in memory of a SoC 202 within the SoC cluster 110 (e.g., based on the table 302). If so, the manageability controller 216 determines whether the firmware section is stored in memory of the local SoC 202 in block 614. If so, the manageability controller 216 retrieves the firmware section from the dedicated memory 218 of the local SoC 202 in block 616. If, however, the manageability controller 216 determines that the next firmware section is in SoC cluster 110 memory but not in the memory of the local SoC 202 (i.e., it is located within a memory of another SoC 202 within the same SoC cluster 110), the manageability controller 216 communicates with the other SoC 202 over the dedicated manageability controller network 204 to retrieve the firmware section in block 618. Returning to block 610, if the manageability controller 216 determines that the firmware section is not in memory of a SoC 202 within the SoC cluster 110, the manageability controller 216 retrieves the firmware section from external memory in block 612.

In response to retrieving the firmware section in block 612, 616, or 618, the manageability controller 216 determines, in block 620, whether all of the firmware sections forming portions of the global firmware have been retrieved. If not, the method 600 returns to block 610 in which the manageability controller 216 determines whether the next firmware section to retrieve is in the memory of a SoC 202 of the SoC cluster 110. It should be appreciated that what constitutes the "next" firmware section may vary depending on the embodiment. If the manageability controller 216 determines in block 620 that all of the firmware sections of the global firmware have been retrieved, the manageability controller 216 loads the global firmware in block 622. As indicated above, the global firmware is generated based on the combination of the retrieved firmware sections.

Figure 7:
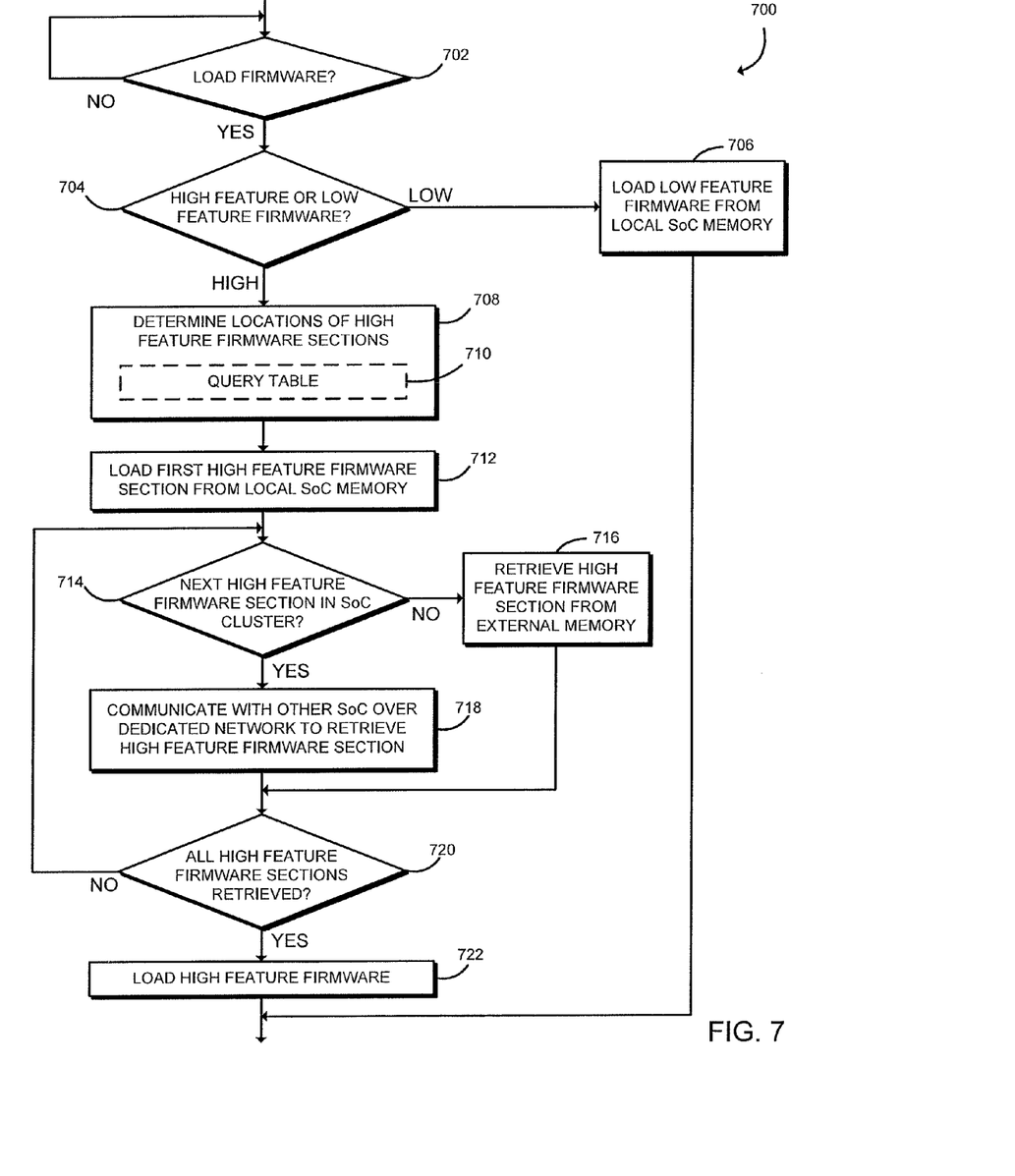
FIG. 7 is a simplified flow diagram of at least one embodiment of a method for sharing hardware resources in a SoC cluster for use of advanced manageability features.

Referring now to FIG. 7, in use, the computing device 100 may execute a method 700 for sharing hardware resources between a SoC 202 having a manageability controller 216 with high feature firmware and other SoCs 202 having manageability controllers 216 with low feature firmware (see, e.g., the embodiment illustrated in FIG. 4). The illustrative method 700 begins with block 702 in which the manageability controller 216 determines whether to load firmware. If so, the manageability controller 216 determines whether the firmware to load is high feature firmware or low feature firmware in block 704. As discussed above, in some embodiments such as that of FIG. 4, the SoC cluster 110 may include a SoC 202 having a manageability controller 216 (e.g., the "primary" controller) with high feature firmware in which sections of the firmware are distributed across memory of the SoCs 202 within the SoC cluster 110 and other SoCs 202 having manageability controllers 216 with low feature firmware, relative to the high feature firmware, that may be stored solely on the dedicated memory 218 of the local SoC 202. As such, the manageability controller 216 determines, in block 704, whether it is a high feature manageability controller 216 or a low feature manageability controller 216. Of course, in some embodiments, a particular manageability controller 216 may be able to utilize manageability features involving both low feature firmware and high feature firmware. In such an embodiment, the manageability controller 216 determines which of the types of firmware to load for the instant purpose.

If the manageability controller 216 determines to load low feature firmware, the manageability controller 216 loads low feature firmware from the dedicated memory 218 of the local SoC 202 in block 706. On the other hand, if the manageability controller 216 determines to load high feature firmware, the manageability controller 216 determines the locations of the various high feature firmware sections in block 708. In doing so, the manageability controller 216 may query a local or remote table (e.g., the table 402, 302) in block 710 as discussed above. In block 712, the manageability controller 216 loads the first high feature firmware section from the memory of the local SoC 202. In doing so, the method 700 assumes that the memory of the local SoC 202 in the particular embodiment includes a firmware section associated with the high feature functions of the manageability controller 216. In embodiments in which that is not the case, the method 700 may skip block 712.

In block 714, the manageability controller 216 determines whether the next high feature firmware section to retrieve is located in a dedicated memory 218 of a SoC 202 within the SoC cluster 110. If so, the manageability controller 216 communicates with the relevant SoC 202 in the SoC cluster 110 over the dedicated manageability controller network 204 to retrieve the high feature firmware section in block 718. However, if the manageability controller 216 determines the high feature firmware section is not in memory of a SoC 202 within the SoC cluster 110, the manageability controller 216 retrieves the high feature firmware section from external memory in block 716 (e.g., from the processing unit memory 114). In block 720, the manageability controller 216 determines whether all of the high feature firmware sections have been retrieved. If not, the method 700 returns to block 714 in which the manageability controller 216 determines whether the next high feature firmware section to retrieve is in the memory of a SoC 202 of the SoC cluster 110. However, if the manageability controller 216 determines in block 720 that all of the high feature firmware sections of the high feature firmware have been retrieved, the manageability controller 216 loads the high feature firmware in block 722. As discussed above in reference to FIG. 5, in some embodiments, the manageability controller 216 may execute the remote high feature firmware section(s) directly from the remote SoC 202 (i.e., without paging or otherwise copying the remote high feature firmware sections to the local SoC 202).

EXAMPLES

Illustrative examples of the technologies disclosed herein are provided below. An embodiment of the technologies may include any one or more, and any combination of, the examples described below.

Example 1 includes a system-on-a-chip (SoC) cluster to facilitate inter-SoC communication, the SoC cluster comprising a first SoC including (i) a first main processor, (ii) a first manageability controller, different from the first main processor, to control functions of the first SoC, and (iii) a memory dedicated to the first manageability controller and having manageability controller firmware stored thereon; a second SoC, different from the first SoC, including (i) a second main processor and (ii) a second manageability controller, different from the second main processor, to control functions of the second SoC; and a dedicated manageability controller network, wherein the second SoC is to access the manageability controller firmware of the memory of the first SoC over the dedicated manageability controller network.

Example 2 includes the subject matter of Example 1, and wherein the first manageability controller comprises a first microcontroller and the second manageability controller comprises a second microcontroller.

Example 3 includes the subject matter of any of Examples 1 and 2, and wherein the memory dedicated to the first manageability controller comprises a static random-access memory (SRAM).

Example 4 includes the subject matter of any of Examples 1-3, and wherein the dedicated manageability controller network comprises a fabric-to-fabric interface.

Example 5 includes the subject matter of any of Examples 1-4, and wherein the second SoC includes a memory dedicated to the second manageability controller and having a first manageability controller firmware section stored thereon; and wherein the memory dedicated to the first manageability controller and accessible by the second SoC has a second manageability controller firmware section stored thereon, wherein the first manageability controller firmware section and the second manageability controller firmware section are separate portions of a manageability controller firmware to be executed by the second manageability controller.

Example 6 includes the subject matter of any of Examples 1-5, and wherein the memory dedicated to the second manageability controller includes a data structure that identifies a memory location of each section of a plurality of sections of the manageability controller firmware to be executed by the second manageability controller.

Example 7 includes the subject matter of any of Examples 1-6, and wherein the second manageability controller is to access the manageability controller firmware of the memory of the first SoC over the dedicated manageability controller network.

Example 8 includes the subject matter of any of Examples 1-7, and wherein the memory of the first SoC includes (i) a first manageability controller firmware section to be executed by the first manageability controller to control functions of the first SoC and (ii) a second manageability controller firmware section to be retrieved and executed by the second manageability controller to control functions of the second SoC.

Example 9 includes the subject matter of any of Examples 1-8, and wherein the first manageability controller firmware section includes all manageability controller firmware required for the first manageability controller to control functions of the first SoC; and wherein second manageability controller firmware section includes only a portion of manageability controller firmware required for the second manageability controller to control functions of the second SoC.

Example 10 includes a method of sharing hardware resources between a first system-on-a-chip (SoC) and a second SoC within a SoC cluster, the method comprising determining, by a manageability controller of the first SoC, a memory location of a manageability controller firmware section; and communicating, by the manageability controller of the first SoC, with the second SoC over a dedicated manageability controller network to retrieve the manageability controller firmware section from a memory of the second SoC in response to determining the memory location is located on the memory of the second SoC, wherein the memory of the second SoC is dedicated to a manageability controller of the second SoC.

Example 11 includes the subject matter of Example 10, and wherein determining the memory location of the manageability controller firmware section comprises querying a data structure stored on a memory of the first SoC.

Example 12 includes the subject matter of any of Examples 10 and 11, and further including loading, by the manageability controller of the first SoC, the retrieved manageability controller firmware section in response to communicating with the second SoC.

Example 13 includes the subject matter of any of Examples 10-12, and further including loading, by the manageability controller of the first SoC, the manageability controller firmware section from a memory of the first SoC in response to the determined memory location being within the memory of the first SoC.

Example 14 includes the subject matter of any of Examples 10-13, and wherein communicating with the second SoC to retrieve the manageability controller firmware section comprises retrieving a high feature firmware section; and wherein the high feature firmware section is to be loaded by the manageability controller of the first SoC with at least one other high feature firmware section as a global high feature manageability controller firmware, the global high feature manageability controller firmware requiring more memory for storage than available in memory on the first SoC.

Example 15 includes the subject matter of any of Examples 10-14, and wherein the memory of the second SoC comprises a static random-access memory (SRAM).

Example 16 includes the subject matter of any of Examples 10-15, and wherein communicating with the second SoC over a dedicated manageability controller network comprises communicating with the second SoC over a fabric-to-fabric interface.

Example 17 includes the subject matter of any of Examples 10-16, and further including communicating, by the manageability controller of the first SoC, with a memory external to the SoC cluster over an input-output subsystem to retrieve the manageability controller firmware section in response to determining the manageability controller firmware section is not stored on a memory of a SoC within the SoC cluster, the input-output subsystem being different from the dedicated manageability controller network.

Example 18 includes a computing device comprising a processor; and a memory having stored therein a plurality of instructions that when executed by the processor cause the computing device to perform the method of any of Examples 10-17.

Example 19 includes one or more machine-readable storage media comprising a plurality of instructions stored thereon that, in response to being executed, result in a computing device performing the method of any of Examples 10-17.

Example 20 includes a computing device for sharing hardware resources between a first system-on-a-chip (SoC) and a second SoC within a SoC cluster, the computing device comprising means for performing the method of any of Examples 10-17.

Example 21 includes a computing device for sharing hardware resources in a system-on-a-chip (SoC) cluster for operational redundancy, the computing device comprising a first SoC of the SoC cluster, the first SoC including a manageability controller to (i) load manageability controller firmware and (ii) identify, in response to detection of a load error associated with the load of the manageability controller firmware, wherein a firmware section of the manageability controller firmware is a cause of the load error; and a communication circuitry to communicate with a second SoC in the SoC cluster over a dedicated manageability controller network to retrieve the identified firmware section from a memory of the second SoC, wherein the memory is dedicated to a manageability controller of the second SoC.

Example 22 includes the subject matter of Example 21, and wherein to load the manageability controller firmware comprises to load manageability controller firmware from a memory located on the first SoC.

Example 23 includes the subject matter of any of Examples 21 and 22, and wherein the manageability controller is further to load the retrieved firmware section.

Example 24 includes the subject matter of any of Examples 21-23, and wherein the manageability controller is to retrieve, in response to a determination that the load of the retrieved firmware section is a cause of another load error, the identified firmware section from a memory external to the SoC cluster over an input-output subsystem different from the dedicated manageability controller network.

Example 25 includes the subject matter of any of Examples 21-24, and wherein the manageability controller is further to determine, in response to identification of the firmware section of the manageability controller firmware that is the cause of the load error, a memory location of the identified firmware section within the SoC cluster, wherein the memory location is located within the memory of the second SoC.

Example 26 includes a method of sharing hardware resources in a system-on-a-chip (SoC) cluster for operational redundancy, the method comprising loading, by a manageability controller of a first SoC in the SoC cluster, manageability controller firmware; identifying, by the manageability controller of the first SoC and in response to detecting a load error associated with the loading of the manageability controller firmware, a firmware section of the manageability controller firmware causing the load error; communicating, by the manageability controller of the first SoC, with a second SoC in the SoC cluster over a dedicated manageability controller network to retrieve the identified firmware section from a memory of the second SoC, the memory being dedicated to a manageability controller of the second SoC.

Example 27 includes the subject matter of Example 26, and wherein loading the manageability controller firmware comprises loading manageability controller firmware from a memory located on the first SoC.

Example 28 includes the subject matter of any of Examples 26 and 27, and further including loading, by the manageability controller of the first SoC, the retrieved firmware section.

Example 29 includes the subject matter of any of Examples 26-28, and further including retrieving, by the manageability controller of the first SoC and in response to the loading of the retrieved firmware section causing another load error, the identified firmware section from a memory external to the SoC cluster over an input-output subsystem different from the dedicated manageability controller network.

Example 30 includes the subject matter of any of Examples 26-29, and further including determining, by the manageability controller of the first SoC and in response to identifying the firmware section of the manageability controller firmware causing the load error, a memory location of the identified firmware section within the SoC cluster, the memory location being located within the memory of the second SoC.

Example 31 includes a computing device comprising a processor; and a memory having stored therein a plurality of instructions that when executed by the processor cause the computing device to perform the method of any of Examples 26-30.

Example 32 includes one or more machine-readable storage media comprising a plurality of instructions stored thereon that, in response to being executed, result in a computing device performing the method of any of Examples 26-30.

Example 33 includes a computing device for sharing hardware resources in a system-on-a-chip (SoC) cluster for operational redundancy, the computing device comprising means for performing the method of any of Examples 26-30.

The invention claimed is:

1. A system-on-a-chip (SoC) cluster to facilitate inter-SoC communication, the SoC cluster comprising:

a first SoC including (i) a first main processor, (ii) a first manageability controller, different from the first main processor, to control functions of the first SoC, and (iii) a memory dedicated to the first manageability controller and having manageability controller firmware stored thereon;
a second SoC, different from the first SoC, including (i) a second main processor and (ii) a second manageability controller, different from the second main processor, to control functions of the second SoC; and
a dedicated manageability controller network, wherein the second SoC is to access the manageability controller firmware of the memory of the first SoC over the dedicated manageability controller network.

2. The SoC cluster of claim 1, wherein the first manageability controller comprises a first microcontroller and the second manageability controller comprises a second microcontroller.

3. The SoC cluster of claim 1, wherein the memory dedicated to the first manageability controller comprises a static random-access memory (SRAM).

4. The SoC cluster of claim 1, wherein the dedicated manageability controller network comprises a fabric-to-fabric interface.

5. The SoC cluster of claim 1, wherein the second SoC includes a memory dedicated to the second manageability controller and having a first manageability controller firmware section stored thereon; and
wherein the memory dedicated to the first manageability controller and accessible by the second SoC has a second manageability controller firmware section stored thereon, wherein the first manageability controller firmware section and the second manageability controller firmware section are separate portions of a manageability controller firmware to be executed by the second manageability controller.

6. The SoC cluster of claim 5, wherein the memory dedicated to the second manageability controller includes a data structure that identifies a memory location of each section of a plurality of sections of the manageability controller firmware to be executed by the second manageability controller.

7. The SoC cluster of claim 1, wherein the second manageability controller is to access the manageability controller firmware of the memory of the first SoC over the dedicated manageability controller network.

8. The SoC cluster of claim 1, wherein the memory of the first SoC includes (i) a first manageability controller firmware section to be executed by the first manageability controller to control functions of the first SoC and (ii) a second manageability controller firmware section to be retrieved and executed by the second manageability controller to control functions of the second SoC.

9. The SoC cluster of claim 8, wherein the first manageability controller firmware section includes all manageability controller firmware required for the first manageability controller to control functions of the first SoC; and
wherein second manageability controller firmware section includes only a portion of manageability controller firmware required for the second manageability controller to control functions of the second SoC.

10. One or more non-transitory machine-readable storage media comprising a plurality of instructions stored thereon that, in response to execution by a first system-on-a-chip (SoC) within a SoC cluster of a computing device, cause a manageability controller of the first SoC to:
determine a memory location of a manageability controller firmware section; and
communicate with a second SoC of the SoC cluster over a dedicated manageability controller network to retrieve the manageability controller firmware section from a memory of the second SoC in response to determining the memory location is located on the memory of the second SoC,
wherein the memory of the second SoC is dedicated to a manageability controller of the second SoC.

11. The one or more non-transitory machine-readable storage media of claim 10, wherein to determine the memory location of the manageability controller firmware section comprises to query a data structure stored on a memory of the first SoC.

12. The one or more non-transitory machine-readable storage media of claim 10, wherein the plurality of instructions further cause the manageability controller of the first SoC to load the retrieved manageability controller firmware section in response to communication with the second SoC.

13. The one or more non-transitory machine-readable storage media of claim 10, wherein the plurality of instructions further cause the manageability controller of the first SoC to load the manageability controller firmware section from a memory of the first SoC in response to the determined memory location being within the memory of the first SoC.

14. The one or more non-transitory machine-readable storage media of claim 10, wherein to communicate with the second SoC to retrieve the manageability controller firmware section comprises to retrieve a high feature firmware section; and
wherein the high feature firmware section is to be loaded by the manageability controller of the first SoC with at least one other high feature firmware section as a global high feature manageability controller firmware, and
wherein the global high feature manageability controller firmware requires more memory for storage than available in memory on the first SoC.

15. The one or more non-transitory machine-readable storage media of claim 10, wherein to communicate with the second SoC over a dedicated manageability controller network comprises to communicate with the second SoC over a fabric-to-fabric interface.

16. The one or more non-transitory machine-readable storage media of claim 15, wherein the plurality of instructions further cause the manageability controller of the first SoC to communicate with a memory external to the SoC cluster over an input-output subsystem to retrieve the manageability controller firmware section in response to a determination that the manageability controller firmware section is not stored on a memory of a SoC within the SoC cluster, wherein the input-output subsystem is different from the dedicated manageability controller network.

17. A method of sharing hardware resources between a first system-on-a-chip (SoC) and a second SoC within a SoC cluster, the method comprising:
determining, by a manageability controller of the first SoC, a memory location of a manageability controller firmware section;
communicating, by the manageability controller of the first SoC, with the second SoC over a dedicated manageability controller network to retrieve the manageability controller firmware section from a memory of the second SoC in response to determining the memory location is located on the memory of the second SoC, wherein the memory of the second SoC is dedicated to a manageability controller of the second SoC.

18. The method of claim 17, wherein determining the memory location of the manageability controller firmware section comprises querying a data structure stored on a memory of the first SoC.

19. The method of claim 17, further comprising loading, by the manageability controller of the first SoC, the retrieved manageability controller firmware section in response to communicating with the second SoC.

20. The method of claim 17, further comprising loading, by the manageability controller of the first SoC, the manageability controller firmware section from a memory of the first SoC in response to the determined memory location being within the memory of the first SoC.

21. The method of claim 17, wherein communicating with the second SoC to retrieve the manageability controller firmware section comprises retrieving a high feature firmware section; and wherein the high feature firmware section is to be loaded by the manageability controller of the first SoC with at least one other high feature firmware section as a global high feature manageability controller firmware, the global high feature manageability controller firmware requiring more memory for storage than available in memory on the first SoC.

22. The method of claim 17, wherein communicating with the second SoC over a dedicated manageability controller network comprises communicating with the second SoC over a fabric-to-fabric interface; and further comprising communicating, by the manageability controller of the first SoC, with a memory external to the SoC cluster over an input-output subsystem to retrieve the manageability controller firmware section in response to determining the manageability controller firmware section is not stored on a memory of a SoC within the SoC cluster, the input-output subsystem being different from the dedicated manageability controller network.

23. A computing device for sharing hardware resources in a system-on-a-chip (SoC) cluster for operational redundancy, the computing device comprising a first SoC of the SoC cluster, the first SoC including:

a manageability controller to (i) load manageability controller firmware and (ii) identify, in response to detection of a load error associated with the load of the manageability controller firmware, wherein a firmware section of the manageability controller firmware is a cause of the load error; and a communication circuitry to communicate with a second SoC in the SoC cluster over a dedicated manageability controller network to retrieve the identified firmware section from a memory of the second SoC, wherein the memory is dedicated to a manageability controller of the second SoC.

24. The computing device of claim 23, wherein to load the manageability controller firmware comprises to load manageability controller firmware from a memory located on the first SoC, and wherein the manageability controller is further to:

load the retrieved firmware section; and retrieve, in response to a determination that the load of the retrieved firmware section is a cause of another load error, the identified firmware section from a memory external to the SoC cluster over an input-output subsystem different from the dedicated manageability controller network.

25. The computing device of claim 23, wherein the manageability controller is further to determine, in response to identification of the firmware section of the manageability controller firmware that is the cause of the load error, a memory location of the identified firmware section within the SoC cluster, wherein the memory location is located within the memory of the second SoC.

* * * * *